United States Patent [19]

Harris et al.

[11] Patent Number: 5,787,865

[45] Date of Patent: Aug. 4, 1998

[54] RESERVOIR FOR MOTOR VEHICLE FUEL TANK

[75] Inventors: David Edward Harris, Frankenmuth; Randall Lee Dockery, Flushing; Douglas James Golla, Grand Blanc, all of Mich.

[73] Assignee: General Motors Corporation, Detroit, Mich.

[21] Appl. No.: 939,889

[22] Filed: Sep. 29, 1997

[51] Int. Cl.$^6$ ........................................ F02M 37/04
[52] U.S. Cl. .................. 123/516; 123/509; 137/565; 137/38
[58] Field of Search .................. 123/516, 509, 123/514, 510, 495; 137/38, 571, 572, 565

[56] References Cited

U.S. PATENT DOCUMENTS

| | | | |
|---|---|---|---|
| 4,279,232 | 7/1981 | Schuster et al. | 123/516 |
| 4,397,333 | 8/1983 | Liba et al. | 137/574 |
| 4,503,885 | 3/1985 | Hall | 137/574 |
| 4,546,750 | 10/1985 | Brunell et al. | 123/514 |
| 4,651,701 | 3/1987 | Weaver | 123/509 |
| 4,718,827 | 1/1988 | Sutton et al. | 417/244 |
| 4,922,959 | 5/1990 | Sasaki | 123/516 |
| 5,139,000 | 8/1992 | Sawert | 123/516 |
| 5,146,901 | 9/1992 | Jones | 137/565 |
| 5,237,977 | 8/1993 | Tuckey | 137/38 |
| 5,415,146 | 5/1995 | Tuckey | 123/509 |
| 5,452,701 | 9/1995 | Tuckey | 123/509 |
| 5,560,342 | 10/1996 | Fournier | 137/38 |
| 5,579,740 | 12/1996 | Cotton | 123/516 |
| 5,596,971 | 1/1997 | Kidokoro | 123/516 |
| 5,647,328 | 7/1997 | Fournier | 123/509 |
| 5,724,947 | 3/1998 | Takaki | 137/565 |

*Primary Examiner*—Carl S. Miller
*Attorney, Agent, or Firm*—Saul Schwartz

[57] ABSTRACT

A passively filled reservoir in a motor vehicle fuel tank. The fuel tank has an electric fuel pump suspended therein and a tubular conduit through which surplus fuel is returned to the fuel tank. The passively filled reservoir includes a fuel containment vessel below the fuel pump, a passive fill port in the containment vessel juxtaposed a bottom panel of the fuel tank, a one-way valve in the passive fill port, a primary strainer around the containment vessel, and a secondary strainer inside of the containment vessel. The tubular conduit and a vapor discharge port of the electric fuel pump discharge into the containment vessel outside of the secondary strainer for recirculation to the fuel pump of surplus fuel and liquid fuel expelled from the fuel pump through the vapor discharge port. The primary strainer strains liquid fuel flowing through the passive fill port into the containment vessel. Capillary seal characteristics of the primary and the secondary strainers sustain vacuum at an inlet of the electric fuel pump until both the fuel tank and the containment vessel are substantially fully depleted.

4 Claims, 2 Drawing Sheets

RESERVOIR FOR MOTOR VEHICLE FUEL TANK

TECHNICAL FIELD

This invention relates to a fuel reservoir in a motor vehicle fuel tank.

BACKGROUND OF THE INVENTION

A motor vehicle fuel tank commonly has a reservoir mounted therein containing a predetermined quantity of fuel which is made available to an inlet of an electric fuel pump when liquid fuel would otherwise be unavailable to the fuel pump inlet. In reservoirs characterized as "passively filled", the mechanism for transferring fuel from the fuel tank into the reservoir is simply a pressure gradient across a passive fill port of the reservoir which is normally submerged in liquid fuel. In reservoirs characterized as "actively filled", the mechanism for transferring fuel from the fuel tank into the reservoir is a pump, e.g., a jet pump. It is known to return surplus fuel to both actively and passively filled reservoirs, i.e., fuel supplied by the fuel pump in excess of the fuel consumed by the motor. Typically, the surplus fuel is hot due to its having been circulated near the motor. An advantage of a passively filled reservoir relative to an actively filled reservoir is that the passively filled reservoir does not require a pump. An advantage of an actively filled reservoir relative to a passively filled reservoir is that the actively filled reservoir is more easily adapted for positive confinement in the reservoir of hot surplus fuel.

SUMMARY OF THE INVENTION

This invention is a new and improved passively filled reservoir in a motor vehicle fuel tank. The fuel tank has an electric fuel pump mounted therein and a tubular conduit through which surplus fuel is returned to the fuel tank. The passively filled reservoir includes a fuel containment vessel below the fuel pump, a passive fill port in the containment vessel juxtaposed a bottom panel of the fuel tank, a one-way valve in the passive fill port, a primary strainer around the containment vessel, and a secondary strainer inside of the containment vessel. The tubular conduit and a vapor discharge port of the electric fuel pump discharge into the containment vessel outside of the secondary strainer for recirculation to the fuel pump of surplus fuel and liquid fuel expelled from the fuel pump through the vapor discharge port. The primary strainer strains liquid fuel flowing through the passive fill port into the containment vessel. Capillary seal characteristics of the primary and the secondary strainers sustain vacuum at an inlet of the electric fuel pump until both the fuel tank and the containment vessel are substantially fully depleted.

DESCRIPTION OF THE PREFERRED EMBODIMENT

Figure 1:
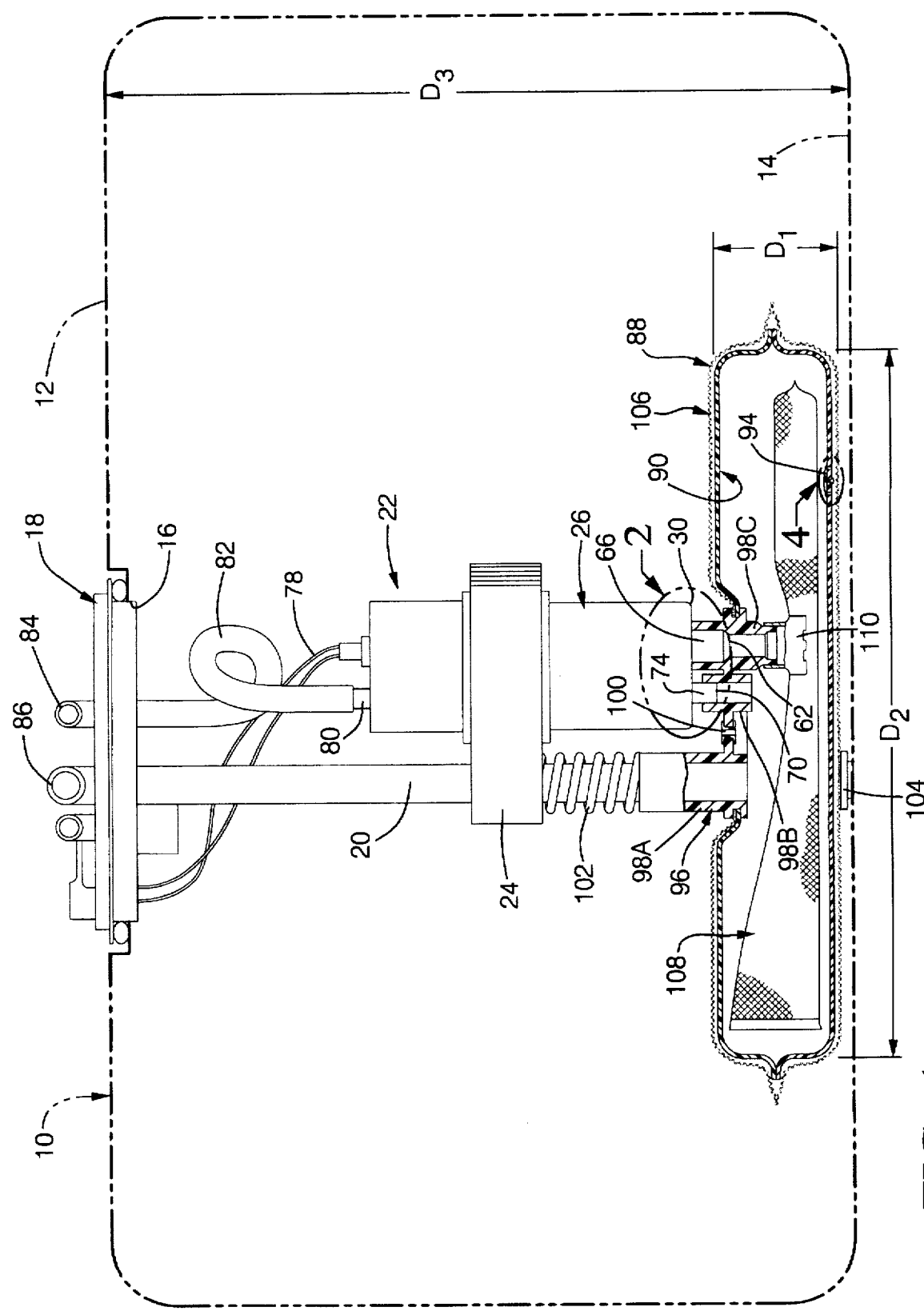
FIG. 1 is a partially broken-away elevational view of a passively filled reservoir according to this invention in a motor vehicle fuel tank.

A schematically-represented motor vehicle fuel tank 10, FIG. 1, includes a top panel 12 and a bottom panel 14. The top panel 12 has an access port 16 therein closed and sealed by a cover 18. A tubular conduit 20 is rigidly attached to the cover 18 inside of the fuel tank perpendicular to the bottom panel 14. An electric fuel pump 22 is suspended inside of the fuel tank 10 on the tubular conduit 20 by a retainer 24.

Figure 2:
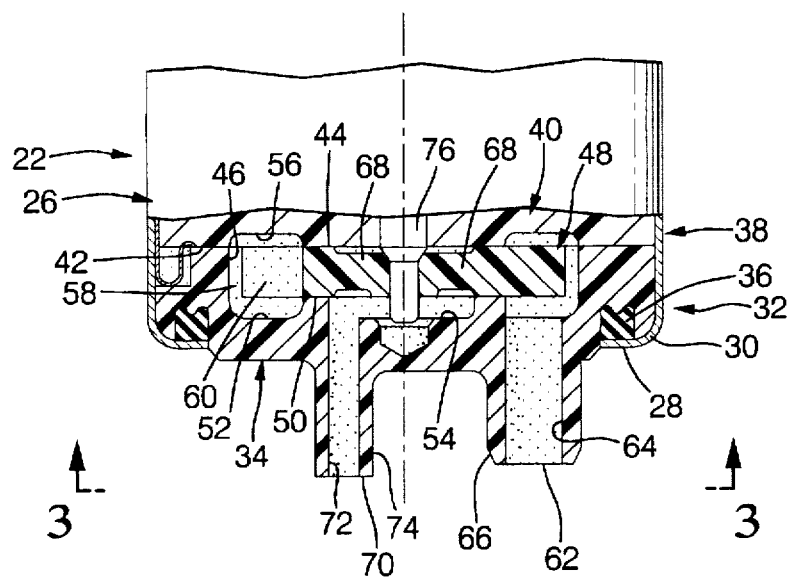
FIG. 2 is an enlarged, partially broken-away view of the portion of FIG. 1 identified by reference circle "2" in FIG. 1.
Figure 3:
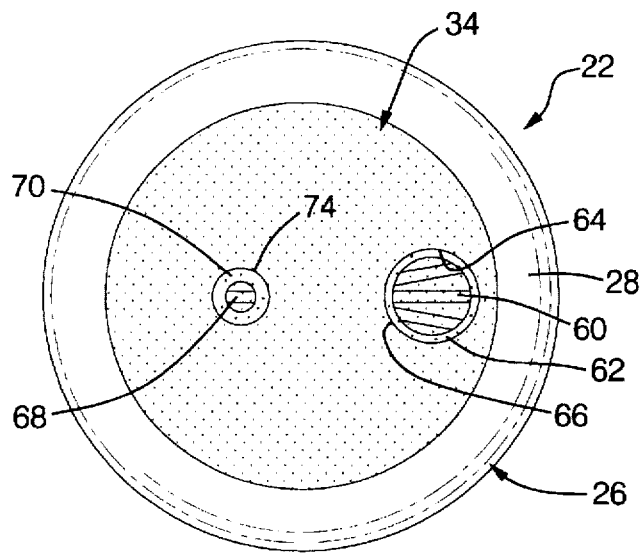
FIG. 3 is a view taken generally along the plane indicated by lines 3—3 in FIG. 2.

The electric fuel pump 22 may have the construction illustrated in U.S. Pat. No. 4,718,827, issued Jan. 12, 1988 and assigned to the assignee of this invention, the disclosure of which is incorporated herein by reference. As seen best in FIG. 2, the electric fuel pump 22 includes a tubular housing 26 having an annular lip 28 at a lower end 30 thereof. A low pressure vapor separation stage 32 of the electric fuel pump 22 includes a plastic inlet body 34 seated against the lip 28 with a seal 36 therebetween closing the lower end 30 of the housing 26. A high pressure pump stage 38 of the electric fuel pump includes a plastic end body 40 having a lower side 42 which seats on an upper side 44 of the inlet body 34 and seals closed a cylindrical cavity 46 in the upper side.

An impeller 48 of the vapor separation stage 32 is disposed in the cavity 46 in the inlet body 34. The impeller may have the construction illustrated in U.S. Pat. No. 4,734,008, issued Mar. 29, 1988 and assigned to the assignee of this invention, the disclosure of which is incorporated herein by reference. An annular boss 50 on the bottom of the cylindrical cavity 46 divides the bottom of the cavity into an annular groove 52 outside of the boss and a shallow circular cavity 54 inside of the boss. The annular groove 52 cooperates with an annular groove 56 in the lower side 42 of the end body 40 of the high pressure stage in defining a pump channel 58 of the vapor separation stage around the periphery of the impeller 48. A plurality of radial vanes 60 on the impeller 48 are disposed in the pump channel 58. An inlet 62 of the electric fuel pump 22 is defined by an end of a passage 64 in a tubular boss 66 on the inlet body 34 which communicates with the pump channel 58.

The circular cavity 54 communicates with the pump channel 58 through a shallow gap, not shown, between the boss 50 and the side of the impeller 48 facing the boss. A plurality of blade-like spokes 68 of the impeller radially inboard of the vanes 60 face the shallow cavity 54. A vapor discharge port 70 of the electric fuel pump is defined by an end of a passage 72 in a second tubular boss 74 on the inlet body which communicates with the shallow cavity 54.

An electric motor, not shown, in the housing 26 above the high pressure pump stage 38 has an armature shaft 76 drivingly connected to the impeller 48. The electric motor is connected to a wiring harness 78 of the motor vehicle through the cover 18. A high pressure discharge port 80 of the electric fuel pump 22 is connected to a motor, not shown, of the motor vehicle through a high pressure hose 82 inside of the fuel tank, a fluid connector 84 on the cover, and a high pressure hose, not shown, outside of the fuel tank. Surplus fuel, i.e., fuel supplied by the electric fuel pump in excess of fuel actually consumed by the motor, is returned to the fuel tank 10 through a second fluid connector 86 on the cover 18 and the tubular conduit 20 inside of the fuel tank.

As seen best in FIG. 1, a passively filled reservoir 88 according to this invention is disposed in the fuel tank 10 below the electric fuel pump 22. The reservoir 88 includes a containment vessel 90 made of a nonporous material such as blow molded plastic and may be rigid or flexible as required to fit through the access port 16. The containment vessel 90 is characterized by a first dimension $D_1$ perpendicular to the bottom panel 14 of the fuel tank which is substantially less than a second dimension $D_2$ parallel to the bottom panel 14 and also substantially less than a depth dimension $D_3$ of the fuel tank between the top and bottom panels 12, 14 thereof. In cross section perpendicular to the second dimension $D_2$, the containment vessel 90 may have any convenient shape, e.g., rectangular, oval-shaped, and the like.

Figure 4:
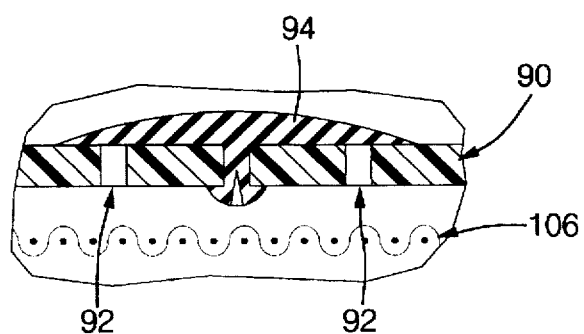
FIG. 4 is an enlarged view of the portion of FIG. 1 identified by reference circle "4" in FIG. 1.

As seen best in FIGS. 1 and 4, a passive fill port 92 of the containment vessel 90 facing the bottom panel 14 of the fuel tank is defined by a plurality of perforations in the containment vessel. A flexible umbrella valve 94 on the containment vessel inside of the latter covers the passive fill port and defines a one-way valve which opens the passive fill port in response to a negative pressure gradient between the containment vessel and the fuel tank and which closes the passive fill port in response to an opposite positive pressure gradient between the containment vessel and the fuel tank.

A plastic connector body 96 is rigidly and sealingly attached to the containment vessel 90 vertically above the passive fill port 92 and includes a plurality of three integral tubular sleeves 98A, 98B, 98C and an orifice 100. The orifice 100 is about in the middle of the containment vessel between a pair of opposite longitudinal ends thereof to prevent drainage of the containment vessel through the orifice when the containment vessel is tilted. The tubular boss 66 defining the inlet 62 of the electric fuel pump 22 plugs into the tubular sleeve 98C. The second tubular boss 74 defining the vapor discharge port 70 of the electric fuel pump plugs into the tubular sleeve 98B. The lower end of the tubular conduit 20 plugs into the third tubular sleeve 98A. A spring 102 between the retainer 24 and the tubular sleeve 98A biases the reservoir 88 against a stop 104 on the bottom panel 14 of the fuel tank.

A primary strainer 106 of the passively filled reservoir 88 surrounds the containment vessel 90 and has a peripheral edge sealingly attached to the plastic connector body 96 such that the containment vessel, including the passive fill port 92 therein, is completely enclosed by the primary strainer. The primary strainer 106 is constructed from a porous material such as nylon, commercially available from DuPont. The primary strainer is operative to separate solid particles on the order of 70 microns from a flow of liquid through the strainer. An important characteristic of the porous material from which the primary strainer 106 is constructed is that it promotes formation of a capillary seal on the primary strainer when only a fraction thereof is submerged in liquid motor vehicle fuel, e.g., gasoline. The containment vessel 90 is closely juxtaposed the bottom panel 14 of the fuel tank with the primary strainer 106 forming only a thin film therebetween.

A secondary strainer 108 of the passively filled reservoir 88 is disposed in the containment vessel 90 and extends substantially the full length of the latter. The secondary strainer 108 is constructed as a tubular bag, closed at opposite ends, from a porous material such as nylon, commercially available from DuPont. The secondary strainer is operative to separate solid particles on the order of 70 microns from a flow of liquid through the strainer. An important characteristic of the porous material from which the secondary strainer 108 is constructed is that it promotes formation of a capillary seal on the secondary strainer when only a fraction thereof is submerged in liquid motor vehicle fuel, e.g., gasoline. A snap-on collar 110 on the secondary strainer 108 rigidly attaches the secondary strainer to the tubular sleeve 98C of the connector body 96.

Liquid fuel introduced into the fuel tank through a conventional filler pipe, not shown, quickly submerges the reservoir 88 because the first dimension $D_1$ of the containment vessel 90 perpendicular to the bottom panel 14 of the fuel tank is only a small fraction of the depth dimension $D_3$ of the fuel tank. The corresponding negative pressure gradient across the umbrella valve 94 opens the latter for passive flow of liquid fuel into the containment vessel through the primary strainer 106 and the passive fill port 92. At the same time, vapor and/or air in the containment vessel is expelled through the orifice 100.

When the electric motor of the electric fuel pump 22 is turned on, the armature shaft 76 rotates the impeller 48 to induce a flow of liquid fuel from the containment vessel 90 into the fuel pump inlet 62 through the secondary strainer 108. The vanes 60 of the impeller 48 accelerate the liquid fuel around the pump channel 58 and force a fraction of the liquid and any vapor in the pump channel radially inward between the impeller and the boss 50 into the shallow circular cavity 54. The pressure gradient between the pump channel 58 and the containment vessel 90 expels the liquid/vapor mixture from the shallow circular cavity 54 into the containment vessel outside of the secondary strainer through the vapor discharge port 70.

Vapor-free fuel supplied by the vapor separation stage 32 to the high pressure stage 38 of the electric fuel pump is boosted in pressure by the high pressure stage and conducted to the motor through the high pressure hose 82 and the fluid connector 84 on the cover 18. Surplus fuel returns to the fuel tank through the tubular conduit 20 and is directed into the containment vessel 90 outside of the secondary strainer 108 through the tubular sleeve 98A. The electric fuel pump 22 always extracts more liquid fuel from the containment vessel 90 than is returned through the tubular conduit 20 and the vapor discharge port 70. The difference between the liquid fuel extracted and the liquid fuel returned is made up by passive flow of liquid fuel from the fuel tank through the primary strainer 106, the passive fill port 92, and the secondary strainer 108.

The secondary strainer cooperates with the passive fill port in prioritizing liquid fuel flow from inside of the containment vessel to the fuel pump inlet 62 such that the liquid fuel returned through the tubular bosses 98A, 98B is withdrawn from the containment vessel at a rate sufficient to prevent a positive pressure gradient from developing between the containment vessel and the fuel tank which could close the umbrella valve 94. The capillary seal characteristic of the secondary strainer blocks vapor in the containment vessel 90 from entering the fuel pump inlet 62. The capture in the containment vessel of hot surplus fuel and of liquid fuel discharged through the vapor discharge port 70 of the electric fuel pump minimizes the flow of liquid fuel from the fuel tank through the primary strainer 106 and thereby maximizes the service life of the primary strainer.

When the fuel tank is depleted, the capillary seal characteristic of the primary strainer effectively seals the primary strainer closed with respect to vapor in the fuel tank to prevent vapor from being drawn into the containment vessel through the passive fill port 92. The capillary seal characteristic of the primary strainer performs the same function when liquid fuel is only temporarily removed from the primary strainer, e.g., during a turn or on an incline when the fuel tank is almost completely depleted. In either of the above circumstances, liquid fuel continues to flow into the fuel pump inlet 62 until the containment vessel is depleted or until contact is reestablished between the primary strainer and liquid fuel in the fuel tank.

Importantly, the capillary seal characteristic of the primary strainer 106 also causes the primary strainer to function like a wick. That is, when the electric fuel pump is on and the passive fill port 92 is not subliquid fuel, liquid fuel but a portion of the primary strainer is, e.g., when the motor vehicle is on an incline, the negative pressure gradient between the containment vessel and the fuel tank induces liquid fuel to separate from the primary strainer and flow through the passive fill port while the capillary seal characteristic of the primary strainer draws an equal flow of liquid fuel from the fuel tank onto the primary strainer. In the circumstance that the motor vehicle is being driven and the fuel tank is almost completely depleted, such wicking effects substantially complete scavenging of liquid fuel from the fuel tank because a fraction of the liquid fuel remaining in the fuel tank is wicked into the containment vessel as described above each time the remaining fuel in the fuel tank splashes against the primary strainer.

Having thus described the invention, what is claimed is:

1. In a motor vehicle fuel tank, the combination comprising:

an electric fuel pump suspended in said fuel tank above a bottom panel thereof having an inlet facing said bottom panel, a tubular conduit in said fuel tank through which a flow of surplus fuel is returned to said fuel tank, a substantially completely closed containment vessel juxtaposed said bottom panel of said fuel tank below said fuel pump inlet and said tubular conduit, a first fluid connection means connecting said fuel pump inlet to said containment vessel so that said containment vessel is the sole source of liquid fuel for said fuel pump inlet, a second connection means connecting said tubular conduit to said containment vessel so that said surplus fuel is substantially completely confined in said containment vessel for recirculation to said fuel pump inlet, a passive fill port in said containment vessel facing said bottom panel of said fuel tank, a one-way valve on said containment vessel operative to permit fluid flow through said passive fill port from said fuel tank into said containment vessel and to block reverse fluid flow through said passive fill port from said containment vessel into said fuel tank, a primary strainer having a peripheral edge sealed against said containment vessel forming a thin film between said containment vessel and said bottom panel of said fuel tank operative to strain liquid fuel flowing from said fuel tank into said containment vessel through said passive fill port and having a capillary seal characteristic operative to wick liquid fuel along said primary strainer and to form a barrier against passage of vapor through said primary strainer, a secondary strainer inside of said containment vessel separating said fuel pump inlet from each of said tubular conduit and said passive fill port having a capillary seal characteristic operative to form a barrier against passage of vapor through said secondary strainer, and an orifice means on said containment vessel on the opposite side of said secondary strainer from said fuel pump inlet operative to discharge vapor from said containment vessel into said fuel tank.

2. The combination recited in claim 1 further comprising:

a vapor discharge port on said electric fuel pump through which a mixture of liquid fuel and vapor is discharged from said electric fuel pump, and a third connection means connecting said vapor discharge port to said containment vessel on the opposite side of said secondary strainer from said fuel pump inlet so that said liquid fuel discharged through said vapor discharge port is substantially completely confined in said containment vessel for recirculation to said fuel pump inlet.

3. The combination recited in claim 2 wherein:

said first connection means comprises a first tubular sleeve on said containment vessel connected to said fuel pump inlet in plug-in fashion, said second connection means comprises a second tubular sleeve on said containment vessel connected to an end of said tubular conduit in plug-in fashion, and said third connection means comprises a third tubular sleeve on said containment vessel connected to said vapor discharge port of said electric fuel pump in plug-in fashion.

4. The combination recited in claim 3 further comprising:

a retainer operative to attach said electric fuel pump to said tubular conduit so that said electric fuel pump is suspended in said fuel tank on said tubular conduit.

* * * * *